United States Patent
Aleem et al.

(10) Patent No.: US 10,606,072 B2
(45) Date of Patent: Mar. 31, 2020

(54) SYSTEMS, DEVICES, AND METHODS FOR LASER EYE TRACKING

(71) Applicant: NORTH INC., Kitchener (CA)

(72) Inventors: Idris S. Aleem, Kitchener (CA); Mélodie Vidal, Kitchener (CA); Jake Chapeskie, Kitchener (CA)

(73) Assignee: North Inc., Kitchener, ON (CA)

( * ) Notice: Subject to any disclaimer, the term of this patent is extended or adjusted under 35 U.S.C. 154(b) by 0 days.

(21) Appl. No.: 16/258,088

(22) Filed: Jan. 25, 2019

(65) Prior Publication Data
US 2019/0171006 A1    Jun. 6, 2019

Related U.S. Application Data

(63) Continuation of application No. 15/868,777, filed on Jan. 11, 2018, now Pat. No. 10,228,558, which is a
(Continued)

(51) Int. Cl.
*G01J 5/02* (2006.01)
*G02B 27/00* (2006.01)
(Continued)

(52) U.S. Cl.
CPC .......... *G02B 27/0093* (2013.01); *G02B 5/32* (2013.01); *G02B 26/101* (2013.01);
(Continued)

(58) Field of Classification Search
CPC .......... G06F 3/013; G06F 3/0304; G06F 3/01; G06K 9/00597; G06K 9/2018;
(Continued)

(56) References Cited

U.S. PATENT DOCUMENTS

| 3,408,133 A | 10/1968 | Lee |
| 3,712,716 A | 1/1973 | Cornsweet et al. |

(Continued)

FOREIGN PATENT DOCUMENTS

| JP | 61-198892 A | 9/1986 |
| JP | 10-319240 A | 12/1998 |

(Continued)

OTHER PUBLICATIONS

Amitai, "P-27: A Two-dimensional Aperture Expander for Ultra-Compact, High-Performance Head-Worn Displays," *SID Symposium Digest of Technical Papers*, vol. 36, No. 1 (2005), pp. 360-363.
(Continued)

*Primary Examiner* — Kiho Kim
(74) *Attorney, Agent, or Firm* — Thomas Mahon (57) ABSTRACT

Systems, devices, and methods for laser eye tracking are described. Laser eye tracking involves scanning laser light over the eye and detecting diffuse reflections of the laser light with one or more photodetector(s). While conventional camera-based eye tracking techniques rely on detecting and identifying specific reflections (i.e., Purkinje images such as the "glint"), the laser eye tracking techniques described herein detect and identify a reduction in reflection intensity due to transmission of laser light through the pupil and/or increased diffusivity of reflections from the cornea relative to reflections from the sclera. This effect is referred to herein as the "corneal shadow" effect. Laser eye tracking uses considerably less power than conventional camera-based eye tracking techniques. As a result, the laser eye tracking techniques described herein do not add significant power demands to a system and can be implemented in wearable heads-up displays without adding significant volume to the system battery.

15 Claims, 6 Drawing Sheets

Related U.S. Application Data continuation of application No. 15/331,204, filed on Oct. 21, 2016, now Pat. No. 9,904,051.

(60) Provisional application No. 62/245,792, filed on Oct. 23, 2015.

(51) Int. Cl.
  *G02B 27/01* (2006.01)
  *G02B 5/32* (2006.01)
  *G02B 26/10* (2006.01)
  *G06F 3/01* (2006.01)
  *G06K 9/00* (2006.01)

(52) U.S. Cl.
  CPC .......... *G02B 27/0172* (2013.01); *G06F 3/011* (2013.01); *G06F 3/013* (2013.01); *G06K 9/00597* (2013.01); *G02B 2027/014* (2013.01); *G02B 2027/0174* (2013.01); *G02B 2027/0178* (2013.01)

(58) Field of Classification Search
  CPC ... G01S 17/16; G01S 17/875; G02B 27/0093; G02B 5/32; G02B 26/101; G02B 27/0172; G02B 2027/014; G02B 2027/0174; G02B 2027/0178
  See application file for complete search history.

(56) References Cited

U.S. PATENT DOCUMENTS

| | | | |
|---|---|---|---|
| 4,973,149 A | 11/1990 | Hutchinson | |
| 4,978,213 A | 12/1990 | El Hage | |
| 5,103,323 A | 4/1992 | Magarinos et al. | |
| 5,231,674 A | 7/1993 | Cleveland et al. | |
| 5,467,104 A | 11/1995 | Furness, III et al. | |
| 5,589,956 A | 12/1996 | Morishima et al. | |
| 5,596,339 A | 1/1997 | Furness, III et al. | |
| 5,742,421 A | 4/1998 | Wells et al. | |
| 6,008,781 A | 12/1999 | Furness, III et al. | |
| 6,027,216 A | 2/2000 | Guyton et al. | |
| 6,184,847 B1 | 2/2001 | Fateh et al. | |
| 6,204,829 B1 | 3/2001 | Tidwell | |
| 6,236,476 B1 | 5/2001 | Son et al. | |
| 6,317,103 B1 | 11/2001 | Furness, III et al. | |
| 6,353,503 B1 | 3/2002 | Spitzer et al. | |
| 6,377,277 B1 | 4/2002 | Yamamoto | |
| 6,639,570 B2 | 10/2003 | Furness, III et al. | |
| 6,972,734 B1 | 12/2005 | Ohshima et al. | |
| 7,473,888 B2 | 1/2009 | Wine et al. | |
| 7,637,615 B2 | 12/2009 | Yamada | |
| 7,640,007 B2 | 12/2009 | Chen et al. | |
| 7,684,105 B2 | 3/2010 | Lamontagne et al. | |
| 7,747,113 B2 | 6/2010 | Mukawa et al. | |
| 7,773,111 B2 | 8/2010 | Cleveland et al. | |
| 7,850,306 B2 | 12/2010 | Uusitalo et al. | |
| 7,925,100 B2 | 4/2011 | Howell et al. | |
| 7,927,522 B2 | 4/2011 | Hsu | |
| 8,120,828 B2 | 2/2012 | Schwerdtner | |
| 8,179,604 B1 | 5/2012 | Prada Gomez et al. | |
| 8,188,937 B1 | 5/2012 | Amafuji et al. | |
| 8,355,671 B2 | 1/2013 | Kramer et al. | |
| 8,560,976 B1 | 10/2013 | Kim | |
| 8,634,119 B2 | 1/2014 | Bablumyan et al. | |
| 8,666,212 B1 | 3/2014 | Amirparviz | |
| 8,704,882 B2 | 4/2014 | Turner | |
| 8,723,790 B1* | 5/2014 | Schaefer ................. G06F 3/011 345/156 | |
| 8,922,481 B1 | 12/2014 | Kauffmann et al. | |
| 8,922,898 B2 | 12/2014 | Legerton et al. | |
| 8,970,571 B1 | 3/2015 | Wong et al. | |
| 8,971,023 B2 | 3/2015 | Olsson et al. | |
| 9,086,687 B2 | 7/2015 | Park et al. | |
| 9,135,708 B2 | 9/2015 | Ebisawa | |
| 9,477,079 B2 | 10/2016 | Bailey et al. | |
| 9,766,449 B2 | 9/2017 | Bailey et al. | |
| 2001/0033402 A1 | 10/2001 | Popovich | |
| 2002/0003627 A1 | 1/2002 | Rieder | |
| 2002/0007118 A1 | 1/2002 | Adachi et al. | |
| 2002/0030636 A1 | 3/2002 | Richards | |
| 2002/0093701 A1 | 7/2002 | Zhang et al. | |
| 2002/0120916 A1 | 8/2002 | Snider, Jr. | |
| 2004/0174287 A1 | 9/2004 | Deak | |
| 2005/0012715 A1 | 1/2005 | Ford | |
| 2006/0238707 A1 | 10/2006 | Elvesjo et al. | |
| 2007/0078308 A1 | 4/2007 | Daly | |
| 2007/0132785 A1 | 6/2007 | Ebersole, Jr. et al. | |
| 2009/0109241 A1 | 4/2009 | Tsujimoto | |
| 2009/0179824 A1 | 7/2009 | Tsujimoto et al. | |
| 2009/0207464 A1 | 8/2009 | Wiltshire et al. | |
| 2009/0258669 A1 | 10/2009 | Nie et al. | |
| 2009/0322653 A1 | 12/2009 | Putilin et al. | |
| 2010/0053555 A1 | 3/2010 | Enriquez et al. | |
| 2010/0060551 A1 | 3/2010 | Sugiyama et al. | |
| 2010/0142015 A1 | 6/2010 | Kuwahara et al. | |
| 2010/0149073 A1 | 6/2010 | Chaum et al. | |
| 2010/0150415 A1 | 6/2010 | Atkinson et al. | |
| 2010/0239776 A1 | 9/2010 | Yajima et al. | |
| 2012/0002256 A1 | 1/2012 | Lacoste et al. | |
| 2012/0139817 A1 | 6/2012 | Freeman | |
| 2012/0169752 A1 | 7/2012 | Kurozuka | |
| 2012/0182309 A1 | 7/2012 | Griffin et al. | |
| 2012/0188158 A1 | 7/2012 | Tan et al. | |
| 2012/0249797 A1 | 10/2012 | Haddick et al. | |
| 2012/0290401 A1 | 11/2012 | Neven | |
| 2012/0302289 A1 | 11/2012 | Kang | |
| 2013/0009853 A1 | 1/2013 | Hesselink et al. | |
| 2013/0016292 A1 | 1/2013 | Miao et al. | |
| 2013/0016413 A1 | 1/2013 | Saeedi et al. | |
| 2013/0088413 A1 | 4/2013 | Raffle et al. | |
| 2013/0135722 A1 | 5/2013 | Yokoyama | |
| 2013/0165813 A1 | 6/2013 | Chang et al. | |
| 2013/0169560 A1 | 7/2013 | Cederlund et al. | |
| 2013/0198694 A1 | 8/2013 | Rahman et al. | |
| 2013/0215235 A1 | 8/2013 | Russell | |
| 2013/0222384 A1 | 8/2013 | Futterer | |
| 2013/0265437 A1 | 10/2013 | Thörn et al. | |
| 2013/0285901 A1 | 10/2013 | Lee et al. | |
| 2013/0300652 A1 | 11/2013 | Raffle et al. | |
| 2013/0332196 A1 | 12/2013 | Pinsker | |
| 2013/0335302 A1 | 12/2013 | Crane et al. | |
| 2014/0045547 A1 | 2/2014 | Singamsetty et al. | |
| 2014/0125760 A1 | 5/2014 | Au et al. | |
| 2014/0198034 A1 | 7/2014 | Bailey et al. | |
| 2014/0198035 A1 | 7/2014 | Bailey et al. | |
| 2014/0202643 A1 | 7/2014 | Hikmet et al. | |
| 2014/0204455 A1 | 7/2014 | Popovich et al. | |
| 2014/0204465 A1 | 7/2014 | Yamaguchi | |
| 2014/0226193 A1 | 8/2014 | Sun | |
| 2014/0229302 A1 | 8/2014 | Adelmann | |
| 2014/0232651 A1 | 8/2014 | Kress et al. | |
| 2014/0285429 A1 | 9/2014 | Simmons | |
| 2014/0368896 A1 | 12/2014 | Nakazono et al. | |
| 2015/0036221 A1 | 2/2015 | Stephenson | |
| 2015/0156716 A1 | 6/2015 | Raffle et al. | |
| 2015/0205126 A1 | 7/2015 | Schowengerdt | |
| 2015/0205134 A1 | 7/2015 | Bailey et al. | |
| 2015/0268821 A1 | 9/2015 | Ramsby et al. | |
| 2015/0289762 A1 | 10/2015 | Popovich et al. | |
| 2015/0325202 A1 | 11/2015 | Lake et al. | |
| 2015/0362734 A1 | 12/2015 | Moser et al. | |
| 2015/0378162 A1 | 12/2015 | Bailey et al. | |
| 2016/0018639 A1 | 1/2016 | Spitzer et al. | |
| 2016/0033771 A1 | 2/2016 | Tremblay et al. | |
| 2016/0202081 A1 | 7/2016 | Debieuvre et al. | |
| 2016/0238845 A1 | 8/2016 | Alexander et al. | |
| 2016/0274365 A1 | 9/2016 | Bailey et al. | |
| 2016/0274758 A1 | 9/2016 | Bailey | |
| 2016/0327796 A1 | 11/2016 | Bailey et al. | |
| 2016/0327797 A1 | 11/2016 | Bailey et al. | |
| 2016/0349514 A1 | 12/2016 | Alexander et al. | |
| 2016/0349515 A1 | 12/2016 | Alexander et al. | |
| 2016/0349516 A1 | 12/2016 | Alexander et al. | |

(56) References Cited

U.S. PATENT DOCUMENTS

| | | |
|---|---|---|
| 2016/0377865 A1 | 12/2016 | Alexander et al. |
| 2016/0377866 A1 | 12/2016 | Alexander et al. |
| 2017/0068095 A1 | 3/2017 | Holland et al. |
| 2017/0097753 A1 | 4/2017 | Bailey et al. |
| 2017/0153701 A1 | 6/2017 | Mahon et al. |
| 2017/0205876 A1 | 7/2017 | Vidal et al. |
| 2017/0212290 A1 | 7/2017 | Alexander et al. |
| 2017/0212349 A1 | 7/2017 | Bailey et al. |
| 2017/0219829 A1 | 8/2017 | Bailey |
| 2017/0299956 A1 | 10/2017 | Holland et al. |
| 2017/0343796 A1 | 11/2017 | Bailey et al. |
| 2017/0343797 A1 | 11/2017 | Bailey et al. |
| 2018/0007255 A1 | 1/2018 | Tang |

FOREIGN PATENT DOCUMENTS

| | | |
|---|---|---|
| JP | 2013-127489 A | 6/2013 |
| JP | 2013-160905 A | 8/2013 |
| KR | 10-2004-0006609 A | 1/2004 |
| WO | 2014/155288 A2 | 10/2014 |
| WO | 2015/123775 A1 | 8/2015 |

OTHER PUBLICATIONS

Ayras et al., "Exit pupil expander with a large field of view based on diffractive optics," *Journal of the SID*, vol. 17, No. 8 (2009), pp. 659-664.
Chellappan et al., "Laser-based display: a review," *Applied Optics*, vol. 49, No. 25 (2010), pp. 79-98.
Cui et al., "Diffraction from angular multiplexing slanted volume hologram gratings," *Optik*, vol. 116 (2005), pp. 118-122.
Curatu et al., "Dual Purpose Lens for an Eye-tracked Projection Head-Mounted Display," *International Optical Design Conference 2006*, SPIE-OSA, vol. 6342 (2007), pp. 63420X-1-63420X-7.
Curatu et al., "Projection-based head-mounted display with eye-tracking capabilities," *Proc. of SPIE*, vol. 5875 (2005), pp. 58750J-1-58750J-9.
Essex, "Tutorial on Optomechanical Beam Steering Mechanisms," College of Optical Sciences, University of Arizona, 2006, 8 pages.
Fernandez et al., "Optimization of a thick polyvinyl alcohol-acrylamide photopolymer for data storage using a combination of angular and peristrophic holographic multiplexing," *Applied Optics*, vol. 45, No. 29 (2006), pp. 7661-7666.
Hainich et al., "Chapter 10: Near-Eye Displays," in: *Displays—Fundamentals & Applications*, 2011, pp. 439-503.
Hornstein et al., "Maradin's Micro-Mirror—System Level Synchronization Notes," *SID 2012 Digest* (2012), pp. 981-984.
Hutchinson et al., "Human-Computer Interaction using eye-gaze input," 1989, IEEE Transactions on Systems, Man, and Cybernetics, vol. 19, No. 6, pp. 1527-1534.
International Search Report and Written Opinion, dated Apr. 25, 2017, for International Application No. PCT/US2016/067246, 10 pages.
International Search Report and Written Opinion, dated Dec. 8, 2016, for International Application No. PCT/US2016/050225, 15 pages.
International Search Report and Written Opinion, dated Jan. 18, 2017, for International Application No. PCT/US2016/054852, 12 pages.
International Search Report and Written Opinion, dated Jun. 8, 2016, for International Application No. PCT/US2016/018293, 17 pages.
International Search Report and Written Opinion, dated Jun. 8, 2016, for International Application No. PCT/US2016/018298, 14 pages.
International Search Report and Written Opinion, dated Jun. 8, 2016, for International Application No. PCT/US2016/018299, 12 pages.
International Search Report and Written Opinion, dated Oct. 13, 2017, for International Application No. PCT/US2017/040323, 16 pages.
International Search Report and Written Opinion, dated Sep. 28, 2017, for International Application No. PCT/US2017/027479, 13 pages.
Itoh et al., "Interaction-free calibration for optical see-through head-mounted displays based on 3D eye localization," *2014 IEEE Symposium on 3D User Interfaces* (3DUI), (2014), pp. 75-82.
Janssen, "Radio Frequency (RF)" 2013, retrieved from https://web.archive.org/web/20130726153946/https://www.techopedia.com/definition/5083/radio-frequency-rf, retrieved on Jul. 12, 2017, 2 pages.
Ji et al., "Real-time eye, gaze, and face pose tracking for monitoring driver vigilance," 2002, Real-Time Imaging, vol. 8, pp. 357-377.
Kessler, "Optics of Near to Eye Displays (NEDs)," *Oasis 2013*, Tel Aviv, Israel, Feb. 19, 2013, 37 pages.
Kress et al., "A review of head-mounted displays (HMD) technologies and applications for consumer electronics," *Proc. of SPIE*, vol. 8720 (2013), pp. 87200A-1-87200A-13.
Kress et al., "Diffractive and Holographic Optics as Optical Combiners in Head Mounted Displays," *Proceedings of the 2013 ACM Conference on Pervasive and Ubiquitous Computing Adjunct Publication*, Zurich, Switzerland, Sep. 8-12, 2013, pp. 1479-1482.
Kress, "Optical architectures for see-through wearable displays," *Bay Area—SID Seminar*, Bay Area, Apr. 30, 2014, 156 pages.
Levola, "7.1: Invited Paper: Novel Diffractive Optical Components for Near to Eye Displays," *SID Symposium Digest of Technical Papers*, vol. 37, No. 1 (2006), pp. 64-67.
Liao et al., "The Evolution of MEMS Displays," *IEEE Transcations on Industrial Electronics*, vol. 56, No. 4 (2009), pp. 1057-1065.
Lippert, "Chapter 6: Display Devices: RSD (Retinal Scanning Display)," in: *The Avionics Handbook*, 2001, 8 pages.
Majaranta et al., "Chapter 3: Eye-Tracking and Eye-Based Human-Computer Interaction," in *Advances in Physiological Computing*, 2014, pp. 39-65.
Merriam-Webster, "Radio Frequencies" retrieved from https://www.merriam-webster.com/table/collegiate/radiofre.htm, retrieved on Jul. 12, 2017, 2 pages.
Schowengerdt et al., "Stereoscopic retinal scanning laser display with integrated focus cues for ocular accommodation," *Proc. of SPIE-IS&T Electronic Imaging*, vol. 5291 (2004), pp. 366-376.
Silverman et al., "58.5L: Late-News Paper: Engineering a Retinal Scanning Laser Display with Integrated Accommodative Depth Cues," *SID 03 Digest*, (2003), pp. 1538-1541.
Takatsuka et al., "Retinal projection display using diffractive optical element," *Tenth International Conference on Intelligent Information Hiding and Multimedia Signal Processing*, IEEE, (2014), pp. 403-406.
Urey et al., "Optical performance requirements for MEMS-scanner based microdisplays," *Conf. on MOEMS and Miniaturized Systems*, SPIE, vol. 4178 (2000), pp. 176-185.
Urey, "Diffractive exit-pupil expander for display applications," *Applied Optics*, vol. 40, No. 32 (2001), pp. 5840-5851.
Viirre et al., "The Virtual Retina Display: A New Technology for Virtual Reality and Augmented Vision in Medicine," *Proc. of Medicine Meets Virtual Reality* (1998), pp. 252-257.

\* cited by examiner

SYSTEMS, DEVICES, AND METHODS FOR LASER EYE TRACKING

TECHNICAL FIELD

The present systems, devices, and methods generally relate to laser eye tracking technologies and particularly relate to scanning laser-based eye tracking technologies that determine a user's gaze direction by detecting corneal shadow position.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to maximize functionality while at the same time minimizing the bulk of the face-worn apparatus. All of the wearable heads-up display devices available today are noticeably bulkier than a typical pair of corrective eyeglasses or sunglasses. Many design and/or technological factors contribute to this bulk, including without limitation: the display technology being implemented, the size and packaging of on-board components, and the power requirements. Components and functionalities with high power requirements can necessitate large on-board batteries or other power supplies which can contribute significant bulk to the overall system. There remains a need in the art for wearable-heads-up display technologies that enable wearable heads-up display devices of more aesthetically-appealing design.

Eye Tracking

Eye tracking is a process by which the position, orientation, and/or motion of the eye is measured and monitored. Typically, the position, orientation, and/or motion of a specific feature of the eye, such as the cornea, pupil, iris, or retinal blood vessels, is measured and monitored. Eye tracking information may be used to determine the gaze direction of the eye and deduce what the user is looking at.

The eye may be tracked in a variety of different ways, the least invasive of which typically employs a camera to capture images and/or videos of the eye. Such camera-based methods typically involve illuminating the complete eye area all at once with infrared light and analyzing images/videos of the illuminated eye to identify characteristic reflections of the infrared light from a particular eye feature. Corneal reflection, also known as the first Purkinje image or "glint," is a characteristic reflection that is used by many camera-based eye trackers. To summarize, conventional eye tracking methods illuminate the eye to produce a characteristic reflection, such as the glint, and analyze images/videos of the eye to identify the relative position of the glint.

Camera-based eye trackers consume a relatively large amount of power. Eye movements can be very fast (on the order of milliseconds) so in order to keep track of the eye both the infrared illumination and the camera are required to be active very often (e.g., at all times, high sampling frequency). In many cases, the camera may provide a constant (or near-constant) video stream that is highly consumptive of power. Even the video processing required to identify glints is computationally significant and therefore also consumptive of significant power.

Eye tracking functionality is highly advantageous in applications of wearable heads-up displays. Some examples of the utility of eye tracking in wearable heads-up displays include: influencing where content is displayed in the user's field of view, conserving power by not displaying content that is outside of the user's field of view, influencing what content is displayed to the user, determining where the user is looking, determining whether the user is looking at displayed content on the display or at objects in the external environment through the display, and providing a user interface via which the user may control/interact with displayed content. However, implementing conventional camera-based eye tracking techniques in a wearable heads-up display adds significant unwanted bulk to the system. Eye tracking components themselves take up space, but more specific to conventional camera-based eye trackers is their high power consumption which adds significant bulk to the battery that powers the wearable heads-up display and potentially to related circuitry and heat dispensation structures.

There is a need in the art for systems, devices, and methods of eye tracking that can integrate into wearable heads-up displays with minimal effect on the size and form factor of the system.

BRIEF SUMMARY

A method of determining a gaze direction of a user may be summarized as including: scanning a laser light over at least a portion of an eye of the user by a scanning laser device, wherein the portion of the eye of the user includes at least a portion of a cornea of the eye of the user; detecting reflections of the laser light from the eye by at least one photodetector; determining a relative intensity of each reflection by a processor; identifying, by the processor, at least one region of the eye that corresponds to a relatively low-intensity reflection; determining, by the processor, a position of the cornea based on the at least one region of the eye that corresponds to the relatively low-intensity reflection; and determining, by the processor, the gaze direction of the user based on the position of the cornea. Scanning a laser light over at least a portion of an eye of the user by a scanning laser device may include scanning the laser light in two dimensions over at least a portion of the eye of the user by the scanning laser device. Scanning a laser light over at least a portion of an eye of the user by a scanning laser device may include scanning the laser light over at least a portion of a holographic optical element by the scanning laser device and redirecting the laser light over the at least a portion of the eye of the user by the holographic optical element. Scanning a laser light over at least a portion of an eye of the user by a scanning laser device may include scanning an infrared laser light over at least a portion of the eye of the user by the scanning laser device. Detecting reflections of the laser light from the eye by at least one photodetector may include detecting diffuse reflections of the laser light from the eye by at least one photodetector. Detecting reflections of the laser light from the eye by at least one photodetector may include detecting reflections of the laser light from the eye by at least two photodetectors.

The method may further include mapping each reflection to a respective region of the eye by the processor. Mapping each reflection to a respective region of the eye by the processor may include mapping at least one relatively low-intensity reflection to a region of the eye. Determining, by the processor, a position of the cornea based on the at least one region of the eye that corresponds to the relatively low-intensity reflection may include identifying, by the processor, a position of the cornea based on mapping at least one relatively low-intensity reflection to a region of the eye.

Mapping each reflection to a respective region of the eye by the processor may include associating each reflection with a corresponding scan parameter of the scanning laser device by the processor. Associating each reflection with a corresponding scan parameter of the scanning laser device by the processor may include associating, by the processor, each reflection with a corresponding scan parameter selected from the group consisting of: a position of at least one scan mirror of the scanning laser device, respective positions of at least two scan mirrors of the scanning laser device, a projection angle of the scanning laser device, and a modulation state of the scanning laser device.

The scanning laser device, the photodetector, and the processor may be respective components of a head-mounted display that further includes a non-transitory processor-readable storage medium. The non-transitory processor-readable storage medium may store data and/or instructions that, when executed by the processor, cause the processor to: determine the relative intensity of each reflection; identify the at least one region of the eye that corresponds to the relatively low-intensity reflection; determine the position of the cornea based on the at least one region of the eye that corresponds to the relatively low-intensity reflection; and determine the gaze direction of the user based on the position of the cornea.

A laser eye tracker may be summarized as including: a scanning laser device; at least one photodetector; a processor communicatively coupled to both the scanning laser device and the at least one photodetector; and a non-transitory processor-readable storage medium communicatively coupled to the processor, wherein the non-transitory processor-readable storage medium stores data and/or instructions that, when executed by the processor, cause: the scanning laser device to scan a laser light over at least a portion of an eye of a user, wherein the portion of the eye of the user includes at least a portion of a cornea of the eye of the user; the at least one photodetector to detect reflections of the laser light from the eye; and the processor to: determine a relative intensity of each reflection; identify at least one region of the eye that corresponds to a relatively low-intensity reflection; determine a position of the cornea based on the at least one region of the eye that corresponds to the relatively low-intensity reflection; and determine a gaze direction of the user based on the position of the cornea. The scanning laser device may include an infrared laser diode, the laser light may include infrared laser light, and the at least one photodetector may include at least one infrared photodetector.

The scanning laser device, the photodetector, the processor, and the non-transitory processor-readable storage medium may all be components of and carried by a head-mounted display. The laser eye tracker may further include a holographic optical element carried by the head-mounted display and positioned in a field of view of the eye of the user to redirect laser light scanned by the scanning laser device towards the eye of the user.

The at least one photodetector may include at least two photodetectors.

A wearable heads-up display may be summarized as including: a support frame that in use is worn on a head of a user; a scanning laser device carried by the support structure, the scanning laser device including an infrared laser diode to output an infrared light and at least one visible light laser diode to output a visible light; a wavelength-multiplexed holographic optical element carried by the support frame and positioned within a field of view of at least one eye of the user when the support frame is worn on the head of the user, the wavelength-multiplexed holographic optical element aligned to receive both the infrared light and the visible light reflected from the scanning laser device and to redirect both the infrared light and the visible light towards the at least one eye of the user when the support frame is worn on the head of the user, wherein the wavelength-multiplexed holographic optical element includes a first hologram that is reflective of the visible light and transmissive of the infrared light and a second hologram that is reflective of the infrared light and transmissive of the visible light, and wherein the wavelength-multiplexed holographic optical element is substantially transparent to environmental light; an infrared photodetector carried by the support frame; a processor communicatively coupled to both the scanning laser device and the infrared photodetector; and a non-transitory processor-readable storage medium communicatively coupled to the processor, wherein the non-transitory processor-readable storage medium stores data and/or instructions that, when executed by the processor, cause: the scanning laser device to scan a laser light over at least a portion of an eye of the user, wherein the laser light includes infrared laser light and the portion of the eye of the user includes at least a portion of a cornea of the eye of the user; the at least one infrared photodetector to detect reflections of the infrared laser light from the eye; and the processor to: determine a relative intensity of each reflection; identify at least one region of the eye that corresponds to a relatively low-intensity reflection; determine a position of the cornea based on the at least one region of the eye that corresponds to the relatively low-intensity reflection; and determine a gaze direction of the user based on the position of the cornea.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for laser eye tracking. More specifically, the present systems, devices, and methods describe eye tracking techniques that scan laser light over at least a portion of the eye and detect the position of the cornea/pupil based on a reduction in the intensity of laser light reflected therefrom. This is in stark contrast to conventional camera-based eye tracking techniques, which rely on detecting specific characteristic reflections from the eye, such as the "glint" and/or other Purkinje images. The intensity of laser light reflected from the cornea/pupil may be reduced relative to other regions of the eye at least because: i) a fraction of the laser light is transmitted into the eye through the pupil and not reflected, and/or ii) the corneal bulge has a smaller radius of curvature relative to the rest of the eye and so produces more widespread diffuse reflections. The laser eye tracking techniques described herein are considerably less power-consumptive than conventional camera-based eye tracking techniques because they do not illuminate the entire eye area all at once and they do not need to make use of a fairly high-resolution video/image stream and corresponding video/image processing algorithms. These low power requirements mean the laser eye tracking techniques described herein do not add significant demand or load to the battery power of a portable system and therefore do not significantly affect the required charge capacity and hence size of the battery when incorporated into, for example, a wearable heads-up display. Furthermore, the laser eye tracking techniques described herein are particularly well-suited for use in a wearable heads-up display that employs a scanning laser projector for display purposes, such as those described in U.S. Provisional Patent Application Ser. No. 62/117,316 (now U.S. Non-Provisional patent application Ser. Nos. 15/046,234, 15/046,254, and 15/046,269); U.S. Provisional Patent Application Ser. No. 62/156,736 (now U.S. Non-Provisional patent application Ser. Nos. 15/145,576, 15/145,609, and 15/145,583); and U.S. Provisional Patent Application Ser. No. 62/242,844. This is because the scanning laser projector that is used for display purposes may be adapted to also provide infrared light for eye tracking purposes as described in U.S. Provisional Patent Application Ser. No. 62/167,767 (now U.S. Non-Provisional patent application Ser. Nos. 15/167,458, 15/167,472, and 15/167,484), so the added hardware needed to implement the laser eye tracking is minimized.

Figure 1:
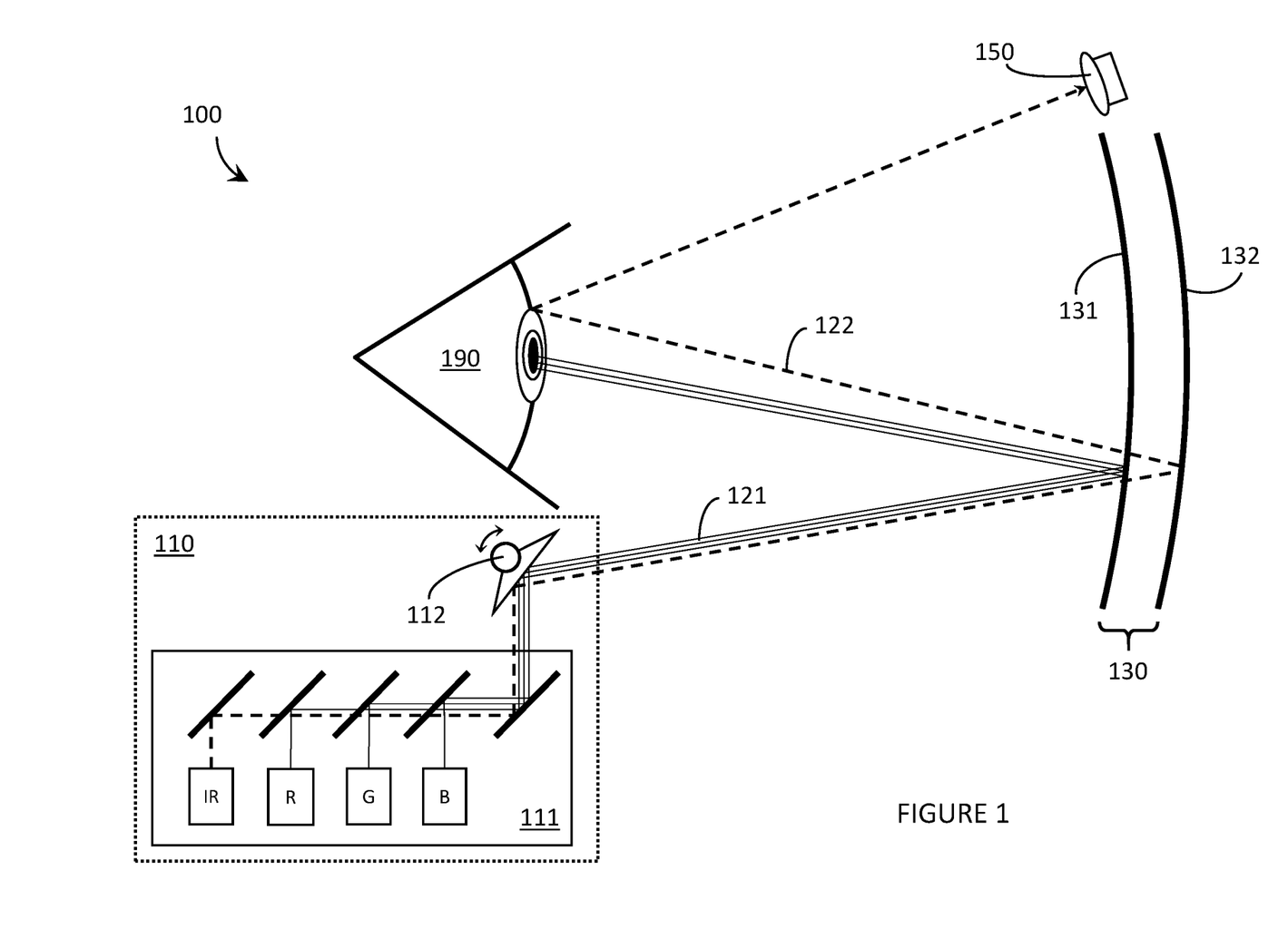
FIG. 1 is a schematic diagram showing a wearable heads-up display that includes a scanning laser projector that has been adapted to integrate laser eye tracking functionality and is particularly well-suited for use in accordance with the present systems, devices, and methods.

FIG. 1 is an illustrative diagram showing a wearable heads-up display 100 that includes a scanning laser projector 110 that has been adapted to integrate laser eye tracking functionality in accordance with U.S. Provisional Patent Application Ser. No. 62/167,767 (now U.S. Non-Provisional patent application Ser. Nos. 15/167,458, 15/167,472, and 15/167,484) and is particularly well-suited for use in accordance with the present systems, devices, and methods. Scanning laser projector 110 comprises a laser module 111 that includes a red laser diode (labelled "R" in FIG. 1), a green laser diode (labelled "G" in FIG. 1), and a blue laser diode (labelled "B" in FIG. 1) and a scan mirror 112. Only one scan mirror 112 is illustrated to minimize clutter but alternative implementations may employ two or more scan mirrors. In addition, laser module 111 also includes an infrared laser diode (labelled "IR" in FIG. 1) for use in laser eye tracking. Scan mirror 112 simultaneously serves as both the scan mirror for laser projection (i.e., for projecting display content) and the scan mirror for laser eye tracking. Scan mirror 112 is used herein as a general example of a mechanism for scanning laser light over an area, while a person of skill in the art will appreciate that other mechanisms, just as oscillating or cantilevered fiber optics, may be employed to similar effect.

Scan mirror 112 may advantageously include one or multiple (e.g., in a DLP configuration) digital microelectromechanical systems ("MEMS") mirror(s). In typical operation, the scan mirror 112 of a scanning laser projector 110 repeatedly scans over its entire range of positions and effectively scans over the entire field of view of the display. Whether or not an image/pixel is projected at each scan position depends on controlled modulation of the laser module 111 and its synchronization with the scan mirror 112. The fact that the scan mirror 112 generally scans over its entire range during operation as a laser projector makes the scan mirror 112 of a scanning laser projector 110 compatible with use for eye tracking purposes. Thus, scanning laser projector 110 is adapted to provide eye tracking functionality without having to compromise or modify its operation as a scanning laser projector. In operation, scan mirror 112 repeatedly scans over its entire range of positions while the RGB laser diodes are modulated to provide the visible light 121 (drawn in solid lines in FIG. 1) corresponding to pixels of a scanned image. At the same time, the infrared laser diode may be used to illuminate the user's eye 190 with infrared laser light 122 (drawn in dashed lines in FIG. 1) for eye tracking purposes. Depending on the implementation, the infrared laser diode may simply be on at all times to scan over the entire area of eye 190 with infrared laser light 122 or the infrared laser diode may be modulated to provide an illumination pattern (e.g., a grid, a set of parallel lines, or any other shape/pattern) on eye 190. Because infrared laser light 122 is invisible to the eye 190 of the user, infrared laser light 122 does not interfere with the scanned image being projected by scanning laser projector 110.

In order to detect infrared laser light 122 that reflects from eye 190, wearable heads-up display 100 includes at least one infrared photodetector 150. While only one photodetector 150 is depicted in FIG. 1, in alternative embodiments any number of photodetectors 150 may be used (e.g., an array of photodetectors 150, or a charge-coupled device based camera that is responsive to light in the infrared wavelength range). The term "photodetector" is used generally herein to refer to a device that is sensitive and responsive to light (i.e., infrared light in the case of an infrared photodetector) and provides signals in response to sensing or detecting such light.

Another adaptation to wearable heads-up display 100 for the purpose of integrating eye tracking functionality into scanning laser projector 110 is wavelength-multiplexing of holographic optical element 130. Wearable heads-up display 100 includes a holographic optical element 130 that redirects laser light output from the laser module 111 of scanning laser projector 110 towards eye 190; however, in wearable heads-up display 100, holographic optical element 130 has been adapted to include at least two wavelength-multiplexed holograms: at least a first hologram 131 that is reflective of the visible light 121 output by laser module 111 and transmissive of the infrared light 122 output by laser module 111, and a second hologram 132 that is reflective of the infrared light 122 output by laser module 111 and transmissive of the visible light 121 output by laser module 111. For the purposes of the present systems, devices, and methods, the term "reflection" and variants such as "reflective" are used for the sake of simplicity and brevity to describe light redirecting from a holographic optical element even though a person of skill in the art will appreciate that non-reflective effects, such as diffractive effects, may contribute to the redirection. A person of skill in the art will appreciate that the redirection (e.g., reflection, refraction, diffraction, or combination thereof) accomplished by a hologram may be of varying completeness depending on the specific details of the hologram. In other words, the holographic optical elements described herein may redirect all or only a portion (e.g., 25%, 50%, 75%, or otherwise) of the laser light incident thereon depending on the design of the corresponding hologram(s) and the characteristics of the photopolymer film into which the hologram(s) is/are encoded. Upon reflection of visible light 121, first hologram 131 may advantageously converge the visible light 121 to a relatively small exit pupil substantially at the eye 190 of the user for the purpose of providing a clear and focused image with a wide field of view. The exit pupil of visible light 121 may have a diameter that at least approximately matches or is less than the diameter of the pupil of the eye 190. Upon reflection of the infrared light 122, second hologram 132 may converge, diverge, or collimate the infrared light 122 to a relatively large exit pupil substantially at the eye 190 of the user for the purpose of illuminating the entire area of eye 190 and tracking all eye positions/orientations/motions within that illuminated area. The exit pupil of infrared light 122 may have a diameter that at least approximately matches or is greater than the diameter of the entire eye 190.

Depending on the specific implementation, holographic optical element 130 may comprise a single volume of material (e.g., photopolymer) that encodes, includes, or generally carries both first hologram 131 and second hologram 132, or alternatively holographic optical element 130 may comprise at least two distinct layers of material (e.g., photopolymer) that are laminated or generally layered together, a first layer of material carrying first hologram 131 and a second layer of material carrying second hologram 132.

Figure 2A:
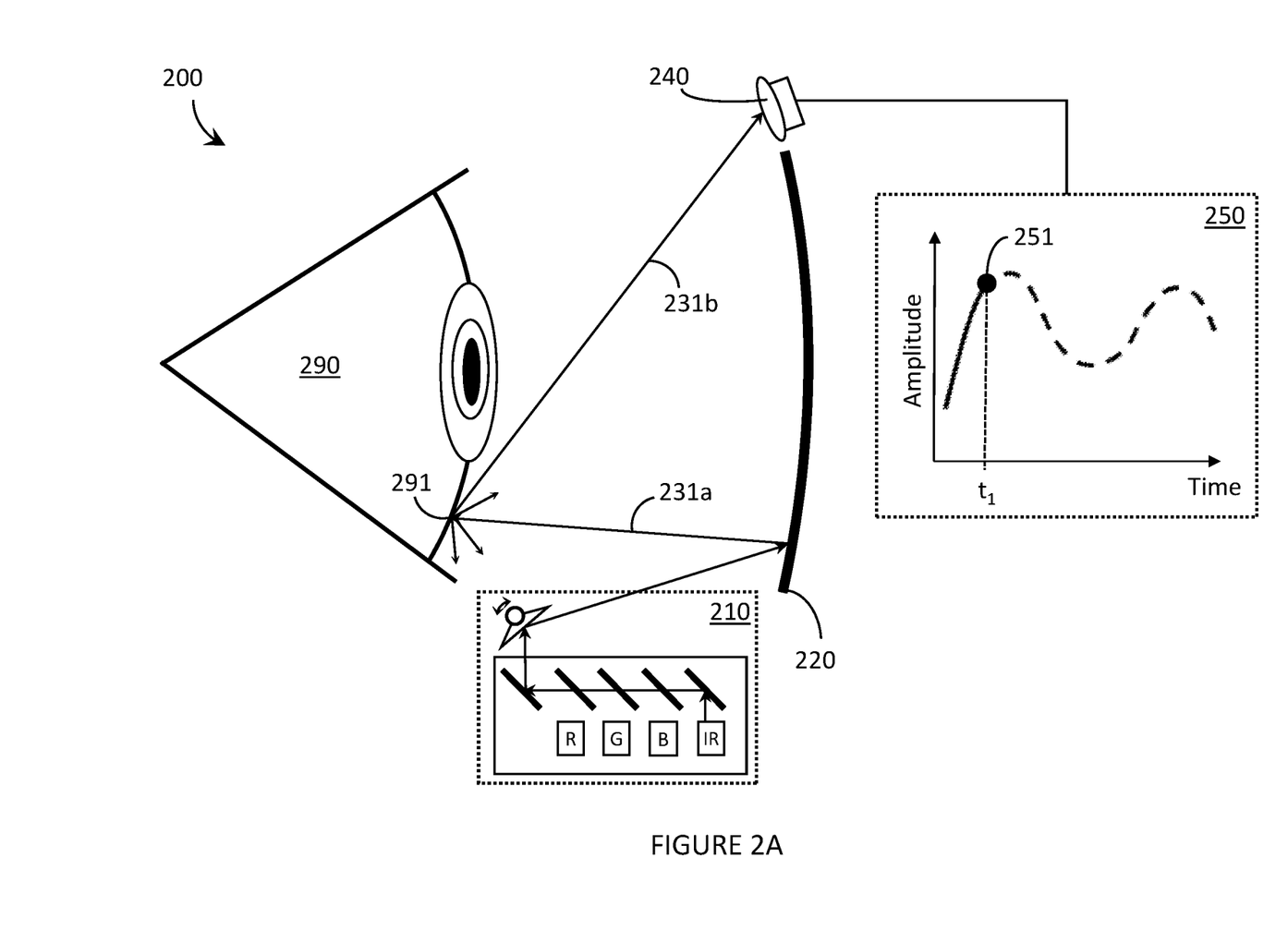
FIG. 2A is a schematic diagram showing a wearable heads-up display during a first stage of an exemplary laser eye tracking operation in accordance with the present systems, devices, and methods.
Figure 2B:
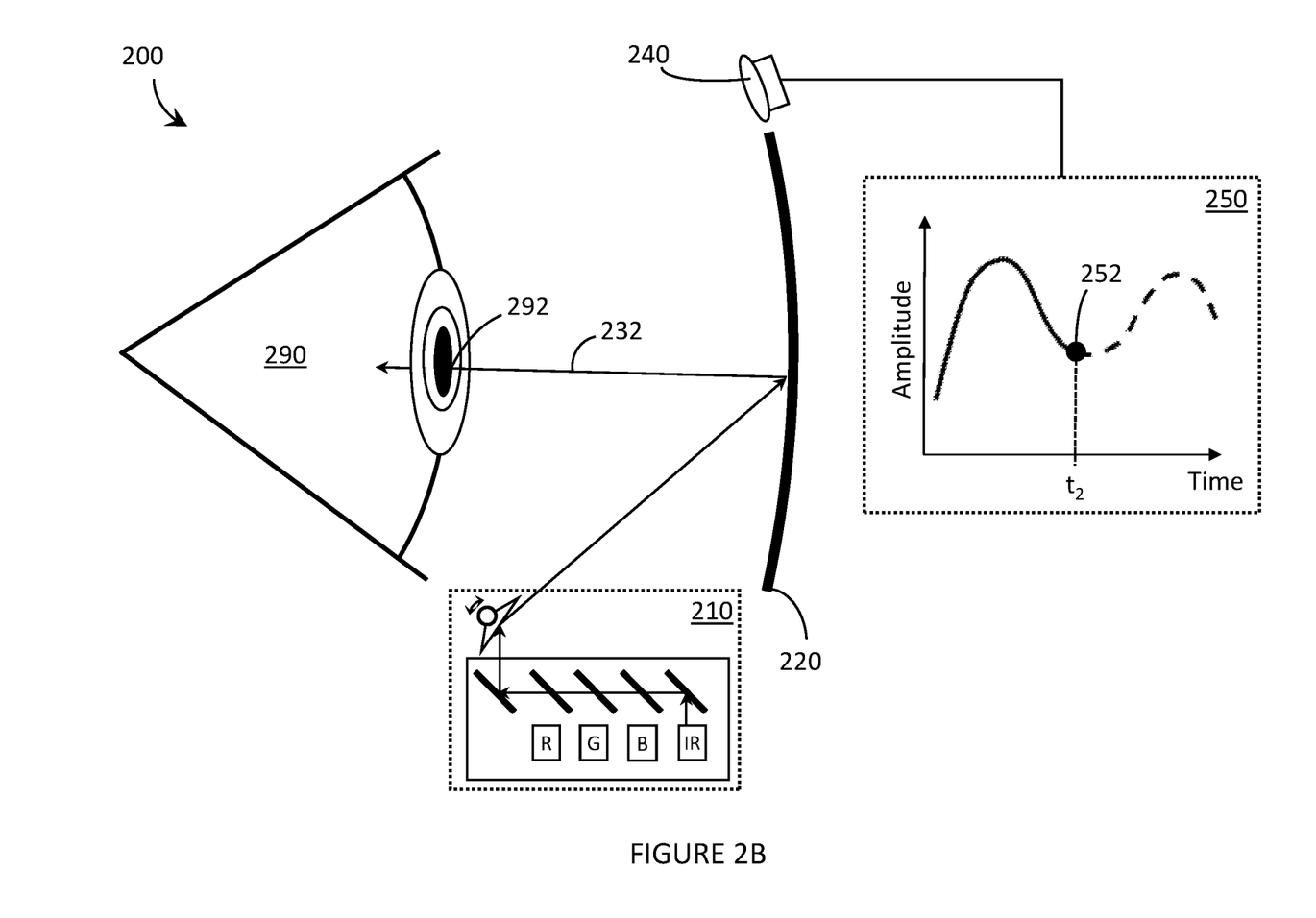
FIG. 2B is a schematic diagram showing the wearable heads-up display from FIG. 2A during a second stage of the exemplary laser eye tracking operation in accordance with the present systems, devices, and methods.
Figure 2C:
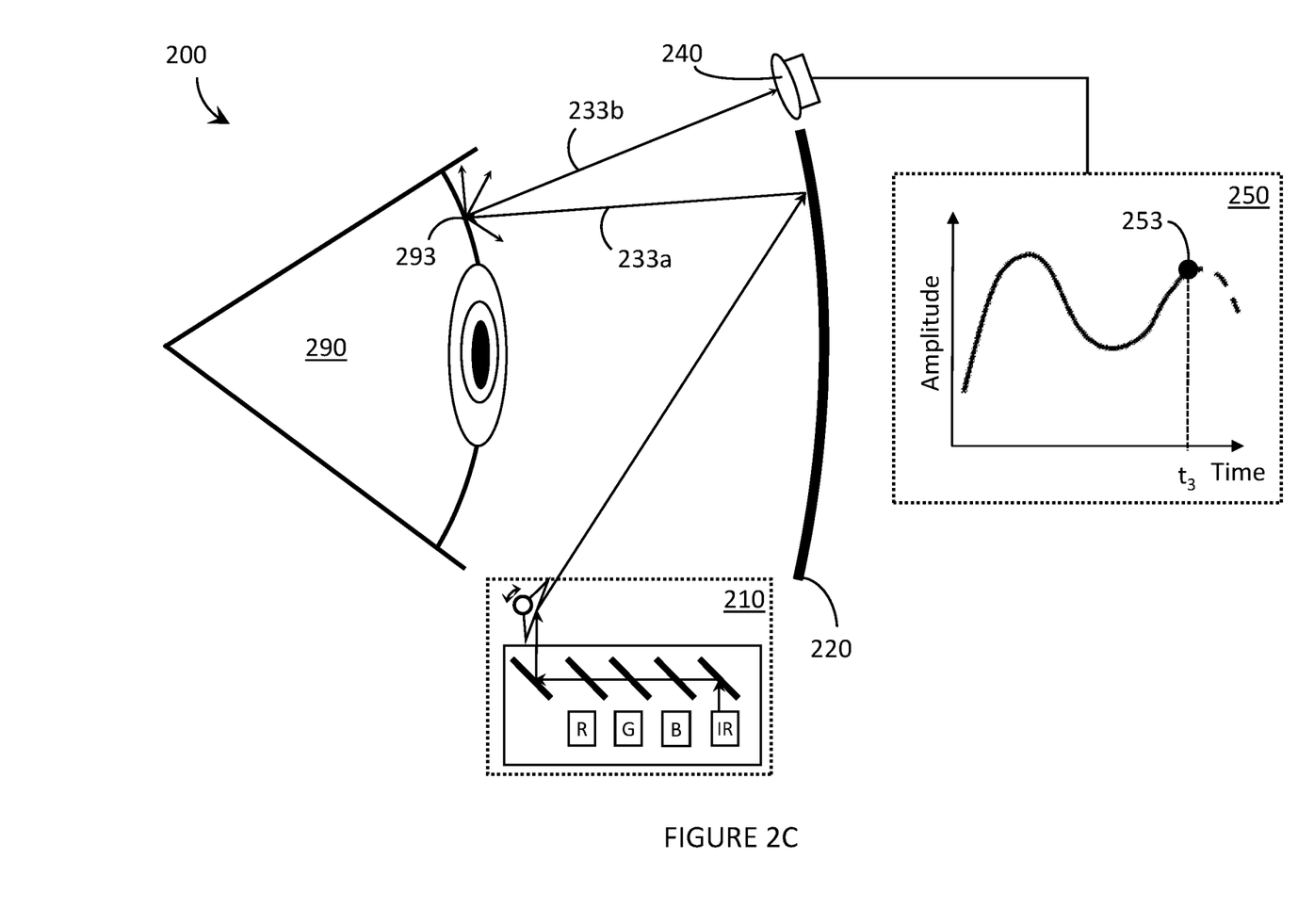
FIG. 2C is a schematic diagram showing wearable heads-up display from FIGS. 2A and 2B during a third stage of the exemplary laser eye tracking operation in accordance with the present systems, devices, and methods.

FIGS. 2A, 2B and 2C provide an illustrative example of an operation of a laser eye tracker in accordance with the present systems, devices, and methods. The illustrated example depicts an application in a scanning laser projector-based wearable heads-up display (substantially similar to display 100 from FIG. 1) because the present systems, devices, and methods have particular advantages in such an application as previously described; however, the systems, devices, and methods for laser eye tracking described herein may be used in applications other than wearable heads-up displays.

FIG. 2A is an illustrative diagram showing a wearable heads-up display 200 during a first stage of an exemplary laser eye tracking operation in accordance with the present systems, devices, and methods. Wearable heads-up display 200 is substantially similar to wearable heads-up display 100 from FIG. 1 and includes: a scanning laser projector 210 with integrated infrared laser diode; a holographic combiner 220 with an infrared layer (e.g., 132 from FIG. 1, not illustrated separately in FIG. 2A to reduce clutter); and an infrared photodetector 240. The illustrated exemplary laser eye tracking operation may be performed concurrently with or separate from a projection of displayed content. For ease of illustration, no projection of displayed content is shown.

During the first stage of the exemplary laser eye tracking operation depicted in FIG. 2A, infrared laser light 231a (drawn in solid lines in FIG. 2A as distinct from FIG. 1) emitted by scanning laser projector 210 is redirected by holographic combiner 220 towards a first point 291 on eye 290. First point 291 on eye 290 is on the sclera of eye 290 and not on the cornea. The infrared laser light 231a that is incident on eye 290 is diffusely reflected (e.g., scattered) from point 291 over a range of directions. A component (or a range of components) 231b of this diffusely reflected infrared laser light impinges on and is detected by infrared photodetector 240. For the purpose of illustration, FIG. 2A includes graph 250 that represents the amplitude of the output of photodetector 240 at various times during the exemplary operation corresponding to illumination of various points on eye 290 based on various positions/orientations of the scan mirror in projector 210. FIG. 2A shows the exemplary laser eye tracking operation at a first stage corresponding to time $t_1$ in graph 250. For context, the complete output for the exemplary operation (i.e., the sum of all times in the exemplary operation) is illustrated with a dashed line in graph 250 and the portion of the complete output that has been completed up to the current point 251 in time ($t_1$ in FIG. 2A) is illustrated with a solid line. Thus, the diffuse reflection from point 291 on the sclera of eye 290 roughly corresponds to a first peak at 251 in the amplitude of the signal from photodetector 240 as depicted in graph 250. Relatively high amplitude signals from photodetector 240 (such as signal 251 in graph 250) generally correspond to relatively high intensity infrared reflections from eye 290. In accordance with the present systems, devices, and methods, relatively high intensity infrared reflections from eye 290 correspond to points (such as point 291) on the sclera of eye 290.

FIG. 2B is an illustrative diagram showing wearable heads-up display 200 during a second stage of the exemplary laser eye tracking operation in accordance with the present systems, devices, and methods. During the second stage of the exemplary laser eye tracking operation depicted in FIG. 2B, infrared laser light 232 emitted by scanning laser projector 210 is redirected by holographic combiner 220 towards a second point 292 on eye 290. Second point 292 on eye 290 is on the cornea of eye 290 and not on the sclera. An appreciable portion of the infrared laser light 232 that is incident on the cornea at 292 of eye 290 is transmitted through the pupil of eye 290 and not reflected. Some of infrared laser light 232 may be diffusely reflected (not illustrated) but less of infrared laser light 232 is diffusely reflected from second point 292 on the cornea of eye 290 compared to the proportion of infrared laser light 231a that was diffusely reflected from point 291 on the sclera of eye 290. Accordingly, graph 250 shows that at the second stage of the exemplary laser eye tracking operation (corresponding to time t2 in FIG. 2B), the amplitude of the signal from photodetector 240 corresponds to a point 252 in or near a trough or minimum of the complete signal profile. Relatively low amplitude signals from photodetector 240 (such as signal 252 in graph 250) generally correspond to relatively low intensity infrared reflections from eye 290. In accordance with the present systems, devices, and methods, relatively low intensity infrared reflections from eye 290 correspond to points (such as point 292) on the cornea of eye 290.

FIG. 2C is an illustrative diagram showing wearable heads-up display 200 during a third stage of the exemplary laser eye tracking operation in accordance with the present systems, devices, and methods. During the third stage of the exemplary laser eye tracking operation depicted in FIG. 2C, infrared laser light 233a emitted by scanning laser projector 210 is redirected by holographic combiner 220 towards a third point 293 on eye 290. Third point 293 on eye 290 is on the sclera of eye 290 and not on the cornea. The infrared laser light 233a that is incident on eye 290 is diffusely reflected (e.g., scattered) from point 293 over a range of directions. A component (or a range of components) 233b of this diffusely reflected infrared laser light impinges on and is detected by infrared photodetector 240. Accordingly, graph 250 shows that at the third stage of the exemplary laser eye tracking operation (corresponding to time t3 in FIG. 2C), the amplitude of the signal from photodetector 240 corresponds to a point 253 at or near a peak or maximum of the complete signal profile, similar to point 251 at time $t_1$. Relatively low amplitude signals from photodetector 240 (such as signal 252 in graph 250) generally correspond to relatively low intensity infrared reflections from eye 290. In accordance with the present systems, devices, and methods, relatively low intensity infrared reflections from eye 290 correspond to points (such as point 292) on the cornea of eye 290. Thus, the diffuse reflection from point 293 on the sclera of eye 290 roughly corresponds to a second peak at 253 in the amplitude of the signal from photodetector 240 as depicted in graph 250.

As previously described, at least two factors may contribute to the relatively lower intensity infrared reflections from points (292) on the cornea of eye 290 compared to points (291, 293) on the sclera of eye 290: i) a portion of infrared laser signals (232) incident on the cornea of eye 290 may actually be transmitted into eye 290 and not diffusely reflected towards photodetector 240; and/or ii) the portion of infrared light signals (232) incident on the cornea of eye 290 that is diffusely reflected may be diffusely reflected over a wider range of directions because the cornea of eye 290 has a smaller radius of curvature than the sclera of eye 290. Either of these factors, or both of these factors in combination, may result in lower intensity infrared reflections at photodetector 240 when the incident infrared laser light impinges on the cornea of eye 290 compared to when the incident infrared laser light impinges on the sclera of eye 290.

In accordance with the present systems, devices, and methods, an infrared laser light that is scanned over the width of an eye (290) may produce minimal diffuse infrared reflections while the infrared laser light is scanned over the cornea and maximal diffuse infrared reflections while the infrared laser light is scanned over the two respective regions of sclera on either side of the cornea. For a static photodetector (240), this may produce an "M" shaped signal profile having two peaks on either side of one trough as depicted in graph 250 of FIGS. 2A, 2B and 2C. In the present systems, devices, and methods, such a trough is termed a "corneal shadow." Based on the corneal shadow effect, the relative position of the cornea of the eye may be identified by mapping the trough/minimum of the signal from the photodetector (i.e., graph 250) to the corresponding point at which the infrared laser light was incident on the eye (290). This mapping may be done, for example, based on one or more scan parameter(s) of the scanning laser projector (210), including without limitation: a position of at least one scan mirror of the scanning laser projector, respective positions of at least two scan mirrors of the scanning laser projector, a projection angle of the scanning laser projector, and/or a modulation state of the scanning laser projector.

As previously described, the systems, devices, and methods for laser eye tracking described herein are particularly well-suited for use in wearable heads-up displays (though in no way limited to such applications). In addition to being able to integrate with a scanning laser projector-based display system, the laser eye tracking techniques described herein also use considerably less power than conventional camera-based eye tracking techniques and so a wearable heads-up display that implements laser eye tracking as described herein can manage with a considerably smaller battery than what is needed to power conventional camera-based eye tracking. These power savings can arise from any or all of three aspects: i) conventional camera-based eye trackers illuminate the entire area of the eye at all times using an IR LED, whereas laser eye tracking uses an IR laser diode to illuminate only a single small region of the eye at a time (equivalent to the laser spot size); ii) conventional camera-based eye trackers record, store, and process fairly high resolution video of the eye at all times whereas laser eye tracking uses only one or more low power IR photodetector(s) to detect diffuse reflections of IR laser light; and iii) conventional camera-based eye trackers require computationally intensive video processing to identify "glints" whereas laser eye tracking simply identifies relatively low intensity infrared reflections and associates those with regions of the eye (e.g., based on one or more scan parameter (s) of the scanning laser projector).

In accordance with the present systems, devices, and methods, an eye tracking system (or an "eye tracker") may include one or more digital processor(s) communicatively coupled to the one or more (infrared) photodetector(s) and to one or more non-transitory processor-readable storage medium(ia) or memory(ies). The memory(ies) may store processor-executable instructions and/or data that, when executed by the processor, enable the processor to determine the position and/or motion of an eye of the user based on information (e.g., intensity information, such as an intensity pattern/map) provided by the one or more photodetector(s).

Figure 3:
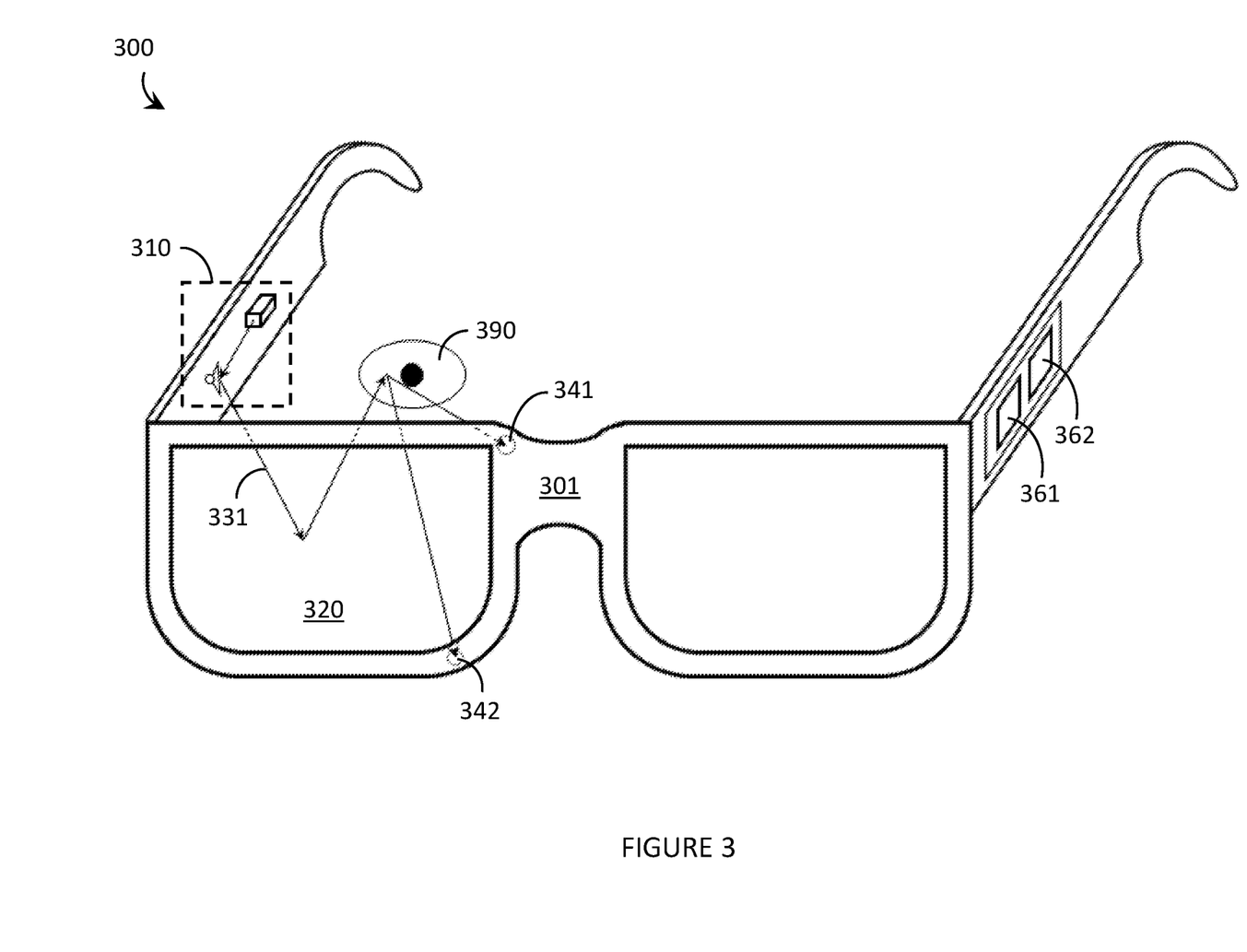
FIG. 3 is a perspective view of a wearable heads-up display that integrates eye tracking and scanning laser projection with minimal component additions and implements laser eye tracking in accordance with the present systems, devices, and methods.

FIG. 3 is a perspective view of a wearable heads-up display 300 that integrates eye tracking and scanning laser projection with minimal component additions and implements laser eye tracking in accordance with the present systems, devices, and methods. Wearable heads-up display 300 includes a support frame 301 (resembling a typical pair of eyeglasses or sunglasses) that carries many of the elements depicted in FIGS. 1, 2A, 2B, and 2C, namely: a scanning laser projector 310 adapted to output infrared laser light 331, a wavelength-multiplexed holographic optical element 320 aligned to redirect the infrared laser light 331 towards an eye 390 of a user, and two photodetectors 341, 342 each responsive to the infrared laser light 331 and positioned at two spatially distinct points on support structure 301. In some applications, incorporating multiple (i.e., two or more) photodetectors can improve the accuracy and reliability of laser eye tracking by, for example, comparing the signals from each and identifying corneal shadow based on coincident low intensity infrared reflections detected by multiple photodetectors. Holographic optical element 320 is positioned within a field of view of the eye 390 of the user when support frame 301 is worn on a head of the user.

Wearable heads-up display 300 further includes at least one digital processor 361 communicatively coupled to scanning laser projector 310 and photodetectors 341, 342 and at least one non-transitory processor-readable storage medium or memory 362 communicatively coupled to the at least one digital processor 361. The at least one memory 362 stores processor-executable instructions and/or data that, when executed by processor 361, cause wearable heads-up display 300 to implement laser eye tracking as described herein.

As previously described, the corneal shadow effect may be used to determine the gaze direction of a user. With this information, a display system such as a wearable heads-up display may determine what displayed content a user is looking at.

Figure 4:
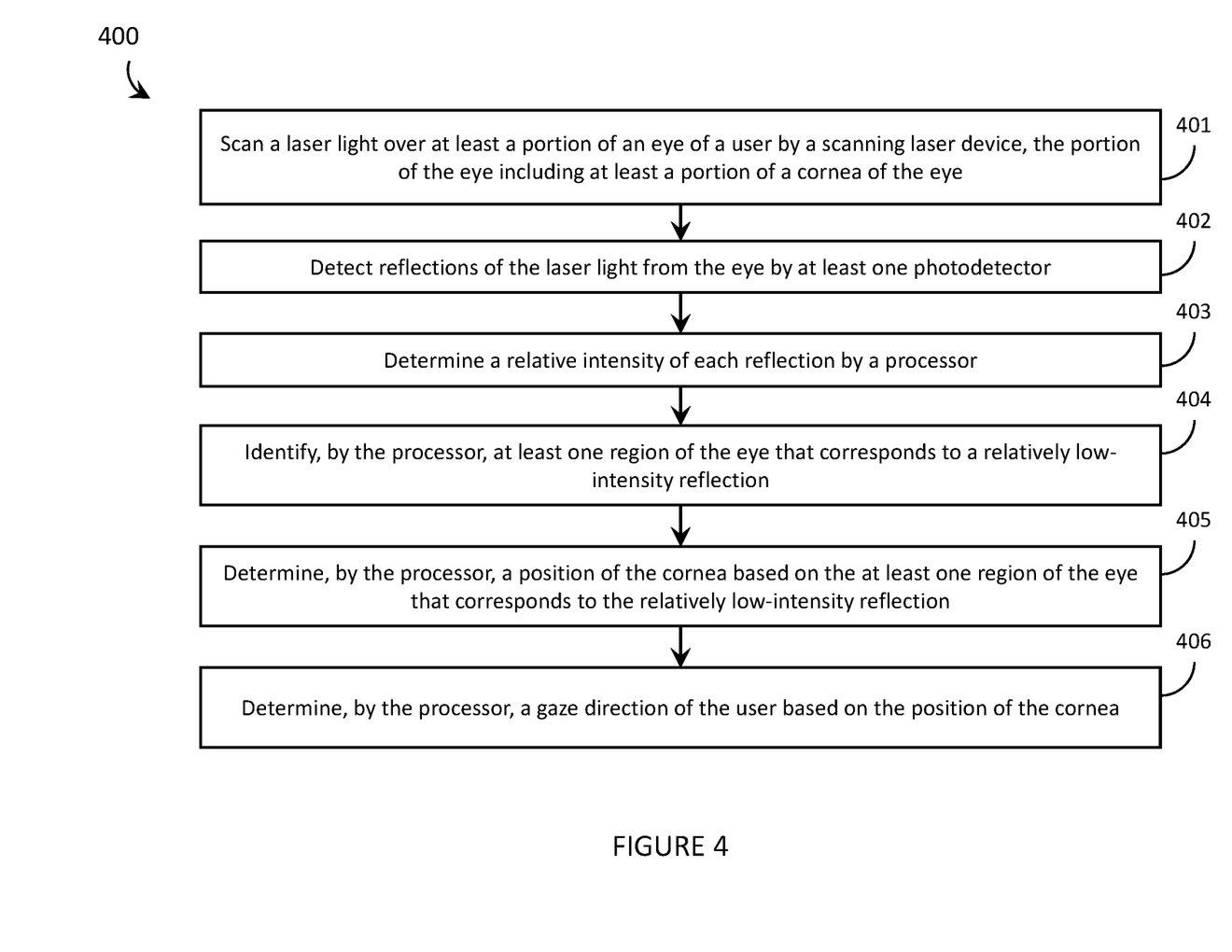
FIG. 4 is a flow-diagram showing a method of determining a gaze direction of a user in accordance with the present systems, devices, and methods.

FIG. 4 is a flow-diagram showing a method 400 of determining a gaze direction of a user in accordance with the present systems, devices, and methods. Method 400 includes six acts 401, 402, 403, 404, 405, and 406, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. For the purpose of method 400, the term "user" refers to a person that is having their gaze direction determined by method 400 and may be, for example, a user of wearable heads-up display 300 from FIG. 3.

Various acts of method 400 are performed by components and devices that may be substantially similar to the elements of wearable heads-up display 300 from FIG. 3 and for this reason the elements from FIG. 3 are identified in parentheses when similar elements are described in the context of method 400. A person of skill in the art will appreciate, however, that method 400 may be carried out using systems and devices that are different from those illustrated in FIG. 3, including systems and devices that do not include a wearable heads-up display.

At 401, a scanning laser device (310) scans a laser light (331) over at least a portion of an eye (390) of a user. The portion of the eye that is scanned at 401 includes at least a portion of the cornea of the eye (390). The portion of the scan may be a single continuous area/region of the eye (390) or a collection of multiple disconnected areas/regions of the eye (390). The scanning laser device (310) may include an infrared laser diode and the scanning laser device (310) may scan infrared laser light (331) over the at least a portion of the eye (390) of the user at 401. The scanning laser device (310) may scan laser light (331) directly over the eye (390) of the user, or the scanning laser device (310) may scan the laser light (331) over a holographic optical element (320) from which at least a portion of the laser light (331) may be redirected towards the eye (390) of the user. The scanning laser device (310) may scan the laser light (331) in one, two, or three dimensions over at least a portion of the eye (390) of the user.

At 402, at least one photodetector (341 and/or 342) detects reflections of the laser light (331) from the eye (390) of the user. The reflections detected by the at least one photodetector (341, 342) may include diffuse reflections (as opposed to specular reflections, though specular reflections may also be detected by the at least one photodetector (341, 342) if the alignment of scanning laser device (310), eye (390), and photodetector(s) (341, 342) enables such).

At 403, a processor (361) determines a relative intensity of each reflection detected at 402. Generally, as scanning laser device (310) scans laser light (331) over the eye (390), each respective scan position (i.e., each respective point of the eye (390) upon which laser light (331) is incident) may produce a respective diffuse reflection, at least a portion of which is detected by at least one photodetector (341, 342). The relative intensity of each respective diffuse reflection is determined by the processor (361) at 403.

At 404, the processor (361) identifies at least one region of the eye (390) that corresponds to a relatively low-intensity reflection. For example, the processor (361) may identify a dip, trough, or minimum (e.g., 252) in the amplitude of the signal provided by one or more photodetector(s) (341, 342). In some implementations, the processor (361) may map, assign, or otherwise associate each reflection to/with a respective region of the eye (390) and then, once a relatively low-intensity reflection has been identified, the processor (361) may identify the region of the eye (390) to which the relatively low-intensity reflection corresponds. In order to map, assign, or otherwise associate each reflection to/with a respective region of the eye (390), the processor (361) may map, assign, or otherwise associate each reflection to/with a corresponding scan parameter of the scanning laser device (310). As previously described, exemplary scan parameters include, without limitation: a position of at least one scan mirror of the scanning laser device (310), respective positions of at least two scan mirrors of the scanning laser device (310), a projection angle of the scanning laser device (310), and a modulation state of the scanning laser device (310). As an example, the scanning laser device (310) may include a first scan mirror that scans laser light over the eye (390) in a horizontal dimension and a second scan mirror that scans laser light over the eye (390) in a vertical dimension. In this configuration, the total scan area overlaying the eye (390) may be represented by a xy-grid for which the available positions of the horizontally-scanning mirror each correspond to a respective x-coordinate and the available positions of the vertically-scanning mirror each correspond to a respective y-coordinate. Each xy-coordinate then corresponds to a unique region of the eye and at 404 the processor (361) may identify one or more xy-coordinate(s) that correspond(s) to a relatively low-intensity reflection. A coordinate system based on xy-coordinates is used here as an example only, whereas alternative implementations may use other coordinate systems (such as radial or polar coordinate systems) or no coordinate system at all (such as an area-based or graph coloring scheme).

At 405, the processor (361) determines a position of the cornea of the eye (390) based on the at least one region of the eye (390) that the processor identified at 404 as corresponding to the relatively low-intensity reflection. The processor (361) may determine the position of the cornea by, for example, identifying a position of the cornea based on a mapping, assignment, or association between reflections and regions of the eye per act 404. For example, the processor (361) may identify the cornea position in the region of the eye that maps to, assigns to, associates with, or generally corresponds to a dip, trough, or minimum (e.g., 252) in the amplitude of the signal provided by one or more photodetector(s) (341, 342). In the xy-grid example above, the processor may identify the cornea position as directly corresponding to the xy-coordinate that provides the lowest intensity reflection. More sophisticated algorithms may identify the cornea position as a particular xy-coordinate (such as a centroid) within or proximate a cluster of xy-coordinates that all have relatively low reflection intensity.

At 406, the processor (361) determines a gaze direction of the user based on the position of the cornea. For example, each cornea position may be mapped, assigned, or associated to/with a respective unique gaze direction and the processor (361) may identify (e.g., via a look-up table or similar) the corresponding gaze direction at 406 once the cornea position is identified at 405. Gaze direction may be characterized as, for example, a vector projection extending out from the xy-coordinate that corresponds to the cornea position (or the centroid thereof). The human eye is relatively constant in size among individual adults with a vertical diameter of about 24 millimeters; likewise, the cornea has a reasonably constant diameter of about 11.5 millimeters. Thus, a vector projection may be defined normal to the surface of the cornea and its direction may be based on this 24 millimeter average vertical diameter of the eye (390) and/or 11.5 millimeter diameter of the cornea.

As previously described, the scanning laser device (310), the photodetector(s) (341, 342), and the processor (361) may all be respective components of a head-mounted display (300) that further includes a non-transitory processor-readable storage medium or memory (362). The non-transitory processor-readable storage medium (362) may store processor-executable instructions and/or data that, when executed by the processor (361), cause the processor to perform, execute, or complete acts 403, 404, 405, and 406 of method 400. The processor (361) may also be communicatively coupled to and control the operation of the scanning laser device (310) and/or the photodetector(s) (341, 342) and the non-transitory processor-readable storage medium (362) may further store processor-executable instructions and/or data that, when executed by the processor (361), cause the scanning laser device (310) to perform, execute, or complete act 401 of method 400 and/or cause the photodetector(s) (341, 342) to perform, execute, or complete act 402 of method 400.

For applications that may involve use outdoors, it can be advantageous to use infrared laser light that is substantially distinct from solar infrared light. For example, infrared laser light having a greater wavelength (e.g., around 950 nm as opposed to around 850 nm) can help to distinguish infrared laser light detected by an infrared photodetector from solar infrared light detected by an infrared photodetector.

Throughout this specification and the appended claims, references are made to mappings, associations, assignments, and the like. Unless the specific context requires otherwise, the act of performing a mapping, association, assignment, or similar should respectively be construed as "effecting a mapping," "effecting an association," "effecting an assignment," and so on. To "effect a mapping" (or similar) means to perform an algorithm and/or a series of data processing acts that results in a mapping from one parameter (e.g., a scan parameter) to another parameter (e.g., a region of the eye). The algorithm and/or series of data processing acts or steps may, for example, employ a pre-defined mapping such as a stored look-up table, or may, for example, employ an application of rules or actions that produce a mapping, such as a series of "if then" or "if then else" statements.

The various mappings, assignments, and/or associations between reflections and regions of the eye and/or cornea positions and/or gaze directions described herein may be based on a result of one or more calibration process(es). For example, a user may be instructed to direct their gaze in a specific direction (or in a series of specific directions) while their eye is tracked in order to calibrate such mappings, assignments, and/or associations.

Certain features and/or activities, including without limitation, blinks, eyelashes, eye saccades, changes in pupil diameter due to changes in brightness, and so on, may be identified and/or compensated in post-processing the signals provided by the photodetector(s) herein. In some implementations, the processor (361) may identify an effect associated with such features and/or activities and either discard, disqualify, skip, omit, or generally not use the corresponding signal. In other implementations, the processor (361) may identify an effect associated with such features and/or activities and then trigger another action, such as interface control based on blink/wink detection and/or heartbeat determination based on saccadic timing.

In order to account for detection of ambient light by the photodetectors (341, 342), either directly or as reflected from the eye (390), the photodetector(s) (341, 342) may regularly be sampled even when the scanning laser device (310) is inactive in order to provide a baseline signal intensity above which laser light reflections may be characterized.

Throughout this specification, reference is often made to a "scanning laser projector" and, in particular, a scanning laser projector that provides infrared laser light for the purposes of laser eye tracking. The term "scanning laser projector" is generally used herein in association with wearable heads-up display implementations of laser eye tracking because, as described, for such implementations a scanning laser projector that is otherwise used for display purposes may be adapted to integrate laser eye tracking functionality. However, the present systems, devices, and methods may more generally be characterized by the use of a "scanning laser device" that may or may not be a scanning laser projector. For example, in implementations of laser eye tracking that do not involve wearable heads-up displays, the infrared laser light needed for laser eye tracking may be provided by a dedicated scanning laser device that does not provide any display or projection or image rendering functionality. In order to capture this generality, the term "scanning laser device" is generally used in lieu of "scanning laser projector" in the claims appended to this specification, though a person of skill in the art will appreciate that a scanning laser projector is an example of a scanning laser device.

In some implementations, multiple photodetectors may be used to detect reflections of narrow waveband (e.g., infrared) light from the eye of the user, and the multiple photodetectors may be physically clustered together or spatially separated around the support frame of a wearable heads-up display (e.g., around a perimeter of the holographic optical element).

Where infrared light is used to illuminate all or a portion of the eye for eye tracking purposes, the full area of the eye may be completely illuminated or (since the projector is refreshing each frame quickly and full eye tracking can be spread out over multiple frames without noticeable delay to the user) portions of the eye may be illuminated in any of various patterns. For example, passive patterns such as a grid or set of parallel lines may be employed, or active patterns may be employed. Examples of active illumination patterns include: "binary style search" in which the area of the eye is divided into binary regions, the eye tracker determines which of the two regions contains a feature (e.g., the pupil or cornea), that region is subsequently divided into binary regions, and the process is continued with smaller and smaller regions until the position of the feature is identified with the desired resolution; "recent area focus" in which once a trusted eye position is found subsequent scans are limited to a subset of the full display that includes the position of the known eye position, with the subset being based on the likelihood of where the eye could possibly move within the time since the trusted eye position was identified; and/or "rotary scan" in which the area of the eye is divided into wedges or pie pieces which are scanned in succession.

The use of infrared light is advantageous because such light is readily distinguishable from the visible light provided by the scanning laser projector. However, infrared light is also prevalent in the environment so a narrow waveband photodetector that is optimized to be responsive to infrared light will nevertheless detect environmental noise. In order to help mitigate this effect, laser light that is used for eye tracking purposes may be encoded in any of a variety of different ways to enable such light to be distinguished from environmental light of a similar wavelength. For example, narrow waveband infrared light that is used for eye tracking purposes may be deliberately polarized and a corresponding polarization filter may be applied to a narrow waveband infrared photodetector so that the photodetector is only responsive to light that is in the narrow waveband and of the correct polarization. As another example, narrow waveband light that is used for eye tracking purposes may be modulated with a deliberate modulation pattern (e.g., intensity, time, intensity and time) and light providing this pattern can be extracted from the intensity map provided by the photodetector during the signal processing and analysis of the photodetector output.

The various embodiments described herein generally reference and illustrate a single eye of a user (i.e., monocular applications), but a person of skill in the art will readily appreciate that the present systems, devices, and methods may be duplicated in a wearable heads-up display in order to provide scanned laser projection and scanned laser eye tracking for both eyes of the user (i.e., binocular applications).

Some wearable heads-up displays (e.g., those that implement certain eyebox replication/expansion schemes) may involve various optical elements in the path of the laser light output by the scanning laser projector. In accordance with the present systems, devices, and methods, wearable heads-up displays that integrate an infrared laser diode into the scanning laser projector for eye tracking purposes may advantageously employ hot optical elements and/or cold optical elements as needed in order to align/separate the respective paths of the visible and infrared lasers.

One consequence of integrating eye tracking into a scanning laser projector is that the resulting eye tracking capability is only active when the scanning laser projector itself is active. In some situations, it may be desirable to provide a coarse eye tracking functionality even when the scanning lase projector is turned off. To this end, the various embodiments described herein may optionally include a separate eye tracking system to enable the user to activate the scanning laser projector by glancing at one or more specific location(s).

The wearable heads-up displays described herein may include one or more sensor(s) (e.g., microphone, camera, thermometer, compass, and/or others) for collecting data from the user's environment. For example, one or more camera(s) may be used to provide feedback to the processor of the wearable heads-up display and influence where on the display(s) any given image should be displayed.

The wearable heads-up displays described herein may include one or more on-board power sources (e.g., one or more battery(ies)), a wireless transceiver for sending/receiving wireless communications, and/or a tethered connector port for coupling to a computer and/or charging the one or more on-board power source(s).

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: U.S. Non-Provisional patent application Ser. No. 15/868,777, U.S. Non-Provisional patent application Ser. No. 15/331,204, U.S. Provisional Patent Application Ser. No. 62/117,316 (now U.S. Non-Provisional patent application Ser. Nos. 15/046,234, 15/046,254, and 15/046,269); U.S. Provisional Patent Application Ser. No. 62/156,736 (now U.S. Non-Provisional patent application Ser. Nos. 15/145,576, 15/145,609, and 15/145,583); U.S. Provisional Patent Application Ser. No. 62/242,844; and U.S. Provisional Patent Application Ser. No. 62/167,767 (now U.S. Non-Provisional patent application Ser. Nos. 15/167,458, 15/167,472, and 15/167,484), are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of determining a gaze direction of a user, the method comprising:
scanning a laser light over at least a portion of an eye of the user by a scanning laser device, wherein the portion of the eye of the user includes at least a portion of a pupil of the eye of the user;
detecting reflections of the laser light from the eye by at least one photodetector;
determining a relative intensity of each reflection by a processor;
mapping each reflection to a respective region of the eye by the processor, wherein mapping each reflection to a respective region of the eye by the processor includes associating each reflection with a corresponding scan parameter of the scanning laser device by the processor;
determining, by the processor, a position of the pupil based on the reflections detected by the at least one photodetector; and
determining, by the processor, the gaze direction of the user based on the position of the pupil.

2. The method of claim 1 wherein scanning a laser light over at least a portion of an eye of the user by a scanning laser device includes scanning the laser light in two dimensions over at least a portion of the eye of the user by the scanning laser device.

3. The method of claim 1 wherein scanning a laser light over at least a portion of an eye of the user by a scanning laser device includes scanning the laser light over at least a portion of a holographic optical element by the scanning laser device and redirecting the laser light over the at least a portion of the eye of the user by the holographic optical element.

4. The method of claim 1 wherein scanning a laser light over at least a portion of an eye of the user by a scanning laser device includes scanning an infrared laser light over at least a portion of the eye of the user by the scanning laser device.

5. The method of claim 1 wherein detecting reflections of the laser light from the eye by at least one photodetector includes detecting diffuse reflections of the laser light from the eye by at least one photodetector.

6. The method of claim 1 wherein detecting reflections of the laser light from the eye by at least one photodetector includes detecting specular reflections of the laser light from the eye by at least one photodetector.

7. The method of claim 1 wherein detecting reflections of the laser light from the eye by at least one photodetector includes detecting reflections of the laser light from the eye by at least two photodetectors.

8. The method of claim 1 wherein associating each reflection with a corresponding scan parameter of the scanning laser device by the processor includes associating, by the processor, each reflection with a corresponding scan parameter selected from a group consisting of: a position of at least one scan mirror of the scanning laser device, respective positions of at least two scan mirrors of the scanning laser device, a projection angle of the scanning laser device, and a modulation state of the scanning laser device.

9. The method of claim 1 wherein the scanning laser device, the photodetector, and the processor are respective components of a head-mounted display that further includes a non-transitory processor-readable storage medium, and wherein the non-transitory processor-readable storage medium stores data and/or instructions that, when executed by the processor, cause the processor to:
determine the position of the pupil based on the reflections detected by the at least one photodetector; and
determine the gaze direction of the user based on the position of the pupil.

10. A laser eye tracker comprising:
a scanning laser device to scan a laser light over at least a portion of an eye of a user, wherein the portion of the eye of the user includes at least a portion of a pupil of the eye of the user;
at least one photodetector;
a processor communicatively coupled to both the scanning laser device and the at least one photodetector; and
a non-transitory processor-readable storage medium communicatively coupled to the processor, wherein the non-transitory processor-readable storage medium stores data and/or instructions that, when executed by the processor, cause:
the at least one photodetector to detect reflections of the laser light from the eye; and
the processor to:
map each reflection to a respective region of the eye;
associate each reflection with a corresponding scan parameter of the scanning laser device;
determine a position of the pupil based on the reflections of the laser light detected by the at least one photodetector; and
determine a gaze direction of the user based on the position of the pupil.

11. The laser eye tracker of claim 10 wherein the scanning laser device includes an infrared laser diode, the laser light includes infrared laser light, and the at least one photodetector includes at least one infrared photodetector.

12. The laser eye tracker of claim 10 wherein the scanning laser device, the photodetector, the processor, and the non-transitory processor-readable storage medium are all components of and carried by a head-mounted display.

13. The laser eye tracker of claim 12, further comprising:
a holographic optical element carried by the head-mounted display and positioned in a field of view of the eye of the user to redirect laser light scanned by the scanning laser device towards the eye of the user.

14. The laser eye tracker of claim 10 wherein the at least one photodetector includes at least two photodetectors.

15. A wearable heads-up display comprising:
a support frame that in use is worn on a head of a user;
a display carried by the support frame;
a scanning laser device carried by the support frame, the scanning laser device including an infrared laser diode to output an infrared light;
an infrared photodetector carried by the support frame;
a processor communicatively coupled to both the scanning laser device and the infrared photodetector; and
a non-transitory processor-readable storage medium communicatively coupled to the processor, wherein the non-transitory processor-readable storage medium stores data and/or instructions that, when executed by the processor, cause:
the scanning laser device to scan an infrared laser light over at least a portion of an eye of the user;
the at least one infrared photodetector to detect reflections of the infrared laser light from the eye; and
the processor to:
map each reflection to a respective region of the eye;
associate each reflection with a corresponding scan parameter of the scanning laser device;
determine a position of the pupil based on the reflections of the infrared laser light detected by the at least one infrared photodetector; and
determine a gaze direction of the user based on the position of the pupil.

\* \* \* \* \*